United States Patent
Fornaciari et al.

(10) Patent No.: US 12,056,040 B2
(45) Date of Patent: Aug. 6, 2024

(54) COMPUTING PLATFORM AND METHOD FOR SYNCHRONIZE THE PROTOTYPE EXECUTION AND SIMULATION OF HARDWARE DEVICES

(71) Applicant: Politecnico di Milano, Milan (IT)

(72) Inventors: William Fornaciari, Parma (IT); Davide Zoni, Piacenza (IT)

(73) Assignee: Politecnico di Milano

( * ) Notice: Subject to any disclaimer, the term of this patent is extended or adjusted under 35 U.S.C. 154(b) by 18 days.

(21) Appl. No.: 17/923,650

(22) PCT Filed: May 10, 2021

(86) PCT No.: PCT/EP2021/062329
§ 371 (c)(1),
(2) Date: Nov. 7, 2022

(87) PCT Pub. No.: WO2021/228766
PCT Pub. Date: Nov. 18, 2021

(65) Prior Publication Data
US 2023/0205673 A1 Jun. 29, 2023

(30) Foreign Application Priority Data
May 11, 2020 (IT) .................. 102020000010531

(51) Int. Cl.
*G06F 11/36* (2006.01)
(52) U.S. Cl.
CPC ...... *G06F 11/3656* (2013.01); *G06F 11/3652* (2013.01)
(58) Field of Classification Search
CPC .................. G06F 11/3656; G06F 11/3652
See application file for complete search history.

(56) References Cited

U.S. PATENT DOCUMENTS 6,463,553 B1  10/2002  Edwards
6,643,803 B1 * 11/2003  Swoboda ............ G06F 11/3656
714/29

(Continued)

FOREIGN PATENT DOCUMENTS

WO     WO 9845784     10/1998

OTHER PUBLICATIONS

Albertsson L: "Simulation-based debugging of soft real-time applications"; (May 30, 2001), pp. 107-108, XP032396260.

(Continued)

*Primary Examiner* — Jigar P Patel
(74) *Attorney, Agent, or Firm* — Mark Bandy; Rankin Hill & Clark, LLP

(57) ABSTRACT

The present disclosure relates to a computing platform and a relative computer implemented method for synchronize the prototype execution and simulation of hardware devices. The computing platform (1) comprises a debugger module (2), a memory (3) for storing instructions and data of a computer program; a CPU (4) configured for executing said computer program; said debugger module (2) being in signal communication with said memory (3) through a first debugger channel (dbg2Mem). Characteristic of the computing platform is that it comprises at least one pin (7) and at least one trigger point module (8), said at least one pin (7) being connectable to an electronic device (Ext) that is external to the computing platform; said at least one trigger point module (8) being in signal communication with said at least one pin (7) through a first trigger channel (tgr2pin), said debugger module (2) through a second trigger channel (t2d), said CPU (4) through a third trigger channel (tProbe), said at least one trigger point module (8) having a first register (10a) for storing a first trigger point (RefStartTrgPnt) that (Continued)

corresponds to a first instruction of said program to be monitored.

10 Claims, 9 Drawing Sheets

(56) References Cited

U.S. PATENT DOCUMENTS

2006/0017664 A1\* 1/2006 Takagi ................ G09G 3/3283
  345/76
2008/0115115 A1   5/2008 Codrescu et al.
2012/0266029 A1\* 10/2012 Mayer ................ G06F 11/3476
  714/45
2015/0278058 A1  10/2015 Kurts et al.

OTHER PUBLICATIONS

Sanjay Sawant et al: "RTL emulation"; 19960601; 1077952576-1077952576, Jun. 1, 1996 (Jun. 1, 1996), pp. 233-235.
Search Report and Written Opinion dated Sep. 9, 2021; Application No. PCT/EP2021/062329; 18 pages.

\* cited by examiner

```
int main ()
{
   funcA ();
   funcB ();      //<-- power trace of funcB ()
   funcC ();
   return 0;
}
```

FIG.1

```
int main ()
{
   funcA ();
   trgSet (GPIO_1);   //_ _asm(" sw (&GPIO_1) , 1 " );
   funcB ();
   trgClear ();
   funcC (GPIO_1);    //_ _asm(" sw (&GPIO_1) , 0 " );
   return 0;
}
```

FIG.2

COMPUTING PLATFORM AND METHOD FOR SYNCHRONIZE THE PROTOTYPE EXECUTION AND SIMULATION OF HARDWARE DEVICES

TECHNICAL FIELD

The present disclosure is related to a computing platform for synchronize the prototype execution and simulation of hardware devices, according to the preamble of claims 1 and 11, respectively.

The computing platform and method are useful, respectively, for synchronize a computer program executed by a CPU of such computing platform with a signal produced by one or more components of such computing platform or with the execution of the same computer program on the same platform simulated by an RTL simulator.

Particularly, but not exclusively, the computing platform is configured for synchronize a computer program that is executed by a CPU of the computing platform with an environmental parameter produced by the same CPU and the method is configured for synchronizing the computing platform having a CPU that executes a computer program with a simulator software.

STATE OF THE ART

Considering a computing platform having a CPU (programmable soft core or not) which executes a computer program, the need for mechanisms to synchronize the evolution of said computer program execution with an environmental parameter, also known as signal, produced by the computing platform (A-synch mechanisms) and the switching activity of the wires internal to the computing platform (B-synch mechanisms) has been a long standing problem.

A-synch mechanisms support performance measurements, i.e., the measure of the execution time for a specific piece of software, as well as a signal produced by the computing platform, e.g. power and thermal profiles.

B-synch mechanisms support the debug of the hardware platform by ensuring the temporal alignment between the computer program executed by the CPU of the computing platform and the same computer program executed by the same CPU of the platform that is simulated by an RTL simulator.

In digital circuit design, Register-Transfer Level (RTL) is a design abstraction technique which allows to model the behavior of a digital circuit.

The computing platform is a digital circuit.

In general, the RTL description of the computing platform can be i) implemented to deliver the physical computing platform or ii) compiled to deliver the virtualized computing platform to be executed/simulated by means of an RTL simulator.

The state of the art provides the so-called software trigger points in order to deliver the A-type and the B-type synchronization mechanisms.

These software trigger points have been used for supporting the evolution of software execution with the external device.

In particular, the executed computer program can be aligned in time with the action of measuring a signal produced by the CPU of the computing platform, e.g., execution time, power consumption etc.

Referring now to FIGS. 1 and 2, a vanilla code of a computer program executing a sequence of three functions, i.e., funcA, funcB and funcC is shown in FIG. 1, whereas FIG. 2 lists the same code augmented with a software implementation of the trigger points.

The trigger points of FIG. 2 are implemented by means of two functions, i.e., trgSet(GPIO_1) and trgClear(GPIO_1), to set and clear, respectively, a predefined General Purpose Input Output (GPIO) pin (see GPIO_1 in FIG. 2). The GPIO_1 pin is reserved to the trigger points and it is used to synchronize the computer program execution with the external equipment, e.g., oscilloscope, to measure the target signal produced by the computing platform.

It is to point out that the computer program execution flow orderly traverses trgSet( ), funcB( ), and trgClear( ), thus allowing to measure the desired signal when funcB is executed.

WO98/45784A1 describes a processor-based device in which a trigger signal TRIG is configured to pulse whenever an internal processor breakpoint has been asserted. The trigger signal TRIG may be used to trigger an external capturing device such as a logic analyzer, and is synchronized with the trace record capture signal TRACECLK. When a breakpoint is generated, the event is synchronized with the trace capture clock signal TRACECLK, after which the trigger signal TRIG is held active for the duration of trace capture.

US2008115115A1 describes a debugging method and system that employs a FIFO queue to support the transmission of the trace of the execution from the computing platform to the external device. In detail, US2008115115A1 focuses on the possibility of dumping the trace of execution to be further post-processed.

Problem of the Prior Art

However, the software trigger points suffer of severe disadvantages.

The first one is the change of the source code of the application. In fact, the use of the software trigger points requires to change the application as shown in FIG. 2. To this end, the method can easily become inefficient since a change in the point to be synchronized imposes a change in the computer program code. Moreover, the source code, and not only the executable, must be available.

The second one is the affecting signal measurements. In fact, the additionally executed computer program to implement the trigger point is executed by the CPU, thus possibly affecting the measured signal.

The third one is the low temporal synchronization accuracy. In fact, the software trigger points leverage the Instruction Set Architecture (ISA) of the CPU. In particular, trgSet( ) and trgClear( ) functions are implemented by means of a set of ISA instructions that must be executed by the CPU to set and clear the physical pin.

Moreover, depending on the CPU microarchitecture of the computing platform, the set and clear actions on the pin are not instantaneous but delayed by a variable number of clock cycles.

It is to point out also that platforms implementing the same ISA can show a different delay in setting and clearing the GPIO pin, since such delay is directly related to the microarchitecture of the platform. To this extent, the temporal accuracy of the synchronization mechanism depends on the microarchitecture of target computing platform and it is not instantaneous.

Unfortunately, the processor-based device described in WO98/45784A1 do not enable a real-time synchronization with an external device. In detail, the processor-based device described in WO98/45784A1 requires the use of a TCLK

[2:0] register that encodes the driver ratio between internal processor clock and TRACECLK.

The debugging method and system described in US2008115115A1 employs a FIFO which means that the frequency of the generation of the trace is different and, in general, higher, with respect to its transmission. So unfortunately also US2008115115A1 do not enable a real-time synchronization with an external device.

In this context, the technical object of the present disclosure is to provide a computing platform and a corresponding computer implemented method for a non-invasive solution to synchronize the program executed by a CPU of the computing platform with i) an environmental parameter produced by components of the platform (i.e. power or temperature), or ii) the execution of the same computer program on the same platform simulated by an RTL simulator.

The specified technical object and the specified aims are substantially achieved by a computing platform and a corresponding computer implemented method for synchronization comprising the technical characteristics described in one or more of the appended claims.

Thanks to the computing platform and computer implemented method, it is possible to measure the execution time of specific sections of the executed code without changing the source code of the application, without affecting signal measurements and with a high temporal synchronization accuracy.

Thanks to the computing platform and method according to present disclosure, it is possible to have a:

i) synchronization with environmental parameters produced by the computing platform. The environmental parameter produced by the platform can be a) the time required to complete the execution of a code segment, or b) a signal produced by the platform, e.g., the power consumption.

The parameters falling in the a) category, allow to ascribe the trigger point solution as a generalization of the methods used to measure the execution time of a piece of computer program executed on the target computing platform. In particular, the trigger points can flexibly measure the time distance between two tagged executed instructions in the computer program. Further, the proposed computing platform allows to additionally measure:

a1) the number of times a specific monitored instruction is executed, or a2) when a block of code, e.g., basic block, or function, is executed several times. For example, considering a loop, it is possible to collect the time differences, if any, between different loop iterations.

The parameters falling in the b) category allow to synchronize, with great accuracy, signals in the physical world with the computer program execution on the computing platform. For example, it is possible to associate the portion of the executed computer program with the corresponding power trace produced by the computing platform with a temporal resolution that is equal to the time period of the clock signal of the computing platform.

ii) Synchronization with the execution of the same platform using an RTL simulator.

The execution of the computer program on the physical computing platform (prototype) is faster than the execution on the same virtualized computing platform, i.e., the same computing platform compiled and simulated by means of an RTL simulator. However, the prototype is a black box from the hardware debug viewpoint, since the evolution over time of the value of the signals of the computing platform cannot be easily monitored. Indeed, breakpoints and watchpoints have been added to support the software debug of the computer program running on the computing platform. However, breakpoints and watchpoints can only be used to debug the executed computer program, while the hardware debug is not possible. To this end, the trigger points allow to synchronize the evolution of the hardware prototype with the RTL simulation of the same platform.

It is to point out also that the RTL simulation permits a full observability of the temporal evolution of each signal in the hardware of the computing platform.

BRIEF DESCRIPTION OF THE DRAWINGS

Further characteristics and advantages of the present disclosure will appear more clearly from the indicative, and therefore non-limiting, description of a preferred but not exclusive embodiment of the computing platform and computer implemented method as illustrated in the enclosed drawings in which:

FIG. 1 shows a vanilla code of a computer program executing a sequence of functions according to the prior art;

FIG. 2 shows the same code of FIG. 1 augmented with a software implementation of the trigger points, according to the prior art;

DETAILED DESCRIPTION

Even when this is not expressly stated, the individual features as described with reference to the particular embodiments shall be intended as auxiliary to and/or interchangeable with other features described with reference to other exemplary embodiments.

Figure 3:
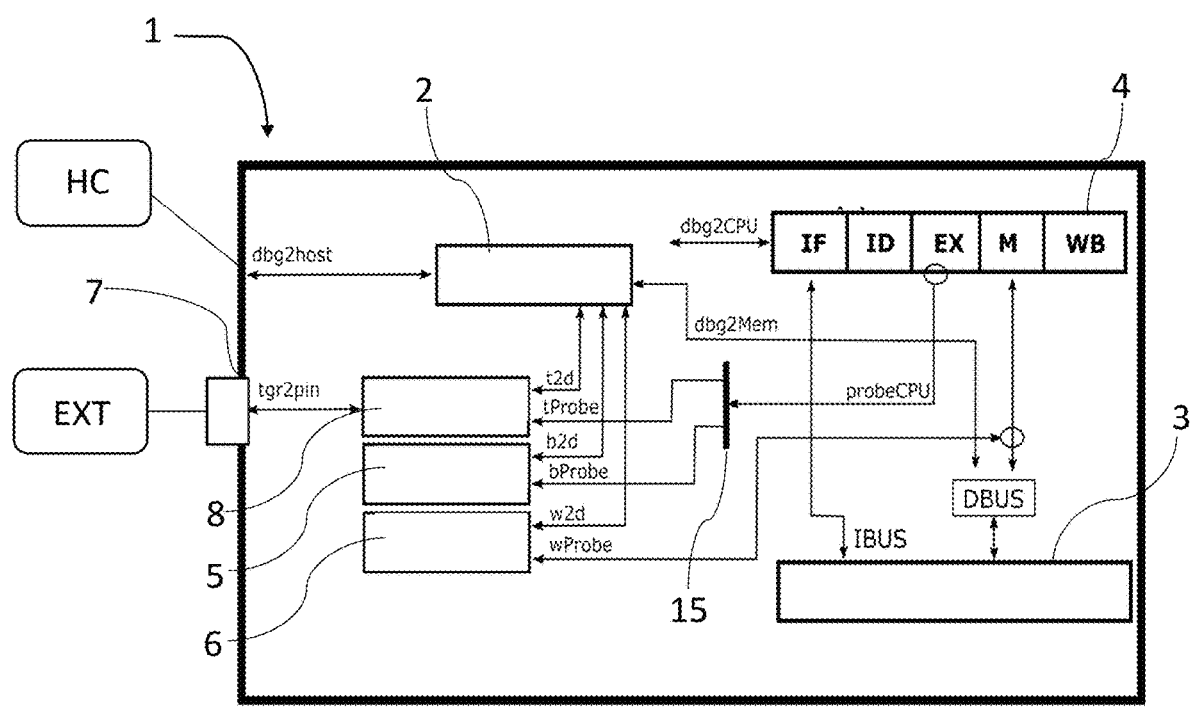
FIG. 3 is a schematic view of the computing platform according to the present disclosure.

With reference to FIG. 3 a schematic view of a computing platform 1 according to the present disclosure is shown.

The computing platform 1 is a digital circuit that allows to execute computer programs.

In particular, the computing platform 1 comprises a plurality of physical components such as a debugger module 2, a memory 3 which stores data and instructions of a computer program and a CPU 4.

The computer program is a collection of instructions that can be executed by the CPU 4 so as the computing platform 1 can perform a specific task.

All the computer programs presented to the CPU 4 for execution must be coded using the Instruction Set Architecture (ISA) of that CPU.

The CPU 4 is a programmable CPU. By way of example the CPU 4 of the computing platform 1 can be a CISC or RISC architectures or other similar architecture.

As shown in FIG. 3, the debugger module 2 is in signal communication with the memory 3 through a first debugger channel dbg2Mem and it is connectable with a host computer HC through a second debugger channel dbg2host.

The debugger module 2 is in signal communication with the CPU 4 through a third debugger channel dbg2CPU.

The host computer HC is a laptop, notebook, or desktop computer or similar that is connected to the computing platform 1 for managing the platform 1 itself via the debugger 2.

According to the embodiment shown in FIG. 3, the CPU 4 can execute the computer program in a pipelined fashion, implementing a 5-stage pipeline, indicated with IF, ID, EX, M and WB.

The name and function of the registers IF, ID, EX, M and WB are known in the art and therefore not described.

The debugger module 2 allows to manage the computing platform 1 from the host computer HC, i.e. the debugger module 2 can access, i.e., read and write, the memory 3 as well as the debugger module 2 can read CPU registers by means of the dbg2CPU channel, and can force the CPU states, i.e., run, halt, reset.

The way of working of the debugger module 2 and its implementation are known in the art and therefore it will not be described.

The computing platform 1 comprises an instruction bus IBUS and a data bus DBUS configured to fetch the program instructions and to load/store program data in the registers of the CPU 4 from the memory 3.

It is to be noted that the first debugger channel dbg2Mem is in communication with the data bus DBUS.

The platform 1 can optionally implement a watchpoint module 5 and/or a breakpoint module 6.

Such modules 5, 6 can be integrated into the debugger 2 or, alternatively, directly interfaced with it.

Watchpoint module 5 and/or a breakpoint module 6 enable the programmer to halt the execution of the computer program in the CPU 4 when certain events occur, and when certain conditions are met. When execution halts, it is possible to examine the contents of memory, registers, or variables, or to take some specified actions before execution resumes.

The way of work of the watchpoint module 6 and/or a breakpoint module 5 are known in the art and therefore they are not described in the description.

It is to be noted that a breakpoint module 5 is in signal communication with the debugger module 2 through a first breakpoint channel b2d and with the CPU 4 (i.e. the EX register in the case of pipelined CPU) through a second breakpoint channel bProbe.

The watchpoint module 6 is in signal communication with the debugger module 2 through a first watchpoint channel w2d and with the CPU 4 (i.e. the M register in the case of pipelined CPU) through a second watchpoint channel wProbe as well as with the memory 3 via the data bus DBUS.

Advantageously, the computing platform 1 comprises at least one pin 7 and at least one trigger point module 8.

It is to be noted that:
the pin 7 is the physical point to connect the computing platform 1 with an external device Ext;
the trigger point module 8 is a digital circuit configured to communicate with the debugger 2 for configuration and data report purposes. Moreover, the trigger point module 8 is configured to sense the CPU 4 (in particular its pipeline) in order to monitor the execution of its target instructions.

The pin 7 acts, therefore, as an output pin, i.e. a pin that allows to transfer signal from the platform 1 to the external device Ext.

The external device Ext can be an oscilloscope or a logic analyzer or similar devices.

The number of the pins 7 as well as the number of trigger point modules 8 is arbitrary.

However, the number of implemented pins 7 must coincide with the number of implemented trigger point modules 8.

In other words, for each trigger point module 8 there is a respective pin 7.

Therefore, in the case of two trigger point modules 8 there two pins 7, whereas each trigger point module 8 is connected with a respective pin 7.

Further, for each pin 7 there is a single external device Ext.

In other words, the computing platform 1 can implement more than one trigger point module 8, each one being in signal communication with a respective pin 7 and, in turn, each pin 7 is connectable with a single external device.

The trigger point module 8 is in signal communication with:
the pin 7 thorough a first trigger channel tgr2pin,
the debugger module 2 through a second trigger channel t2d,
the CPU 4 (i.e. the EX register in the case of pipelined CPU) through a third trigger channel tProbe.

It is to be noted that, regardless the implementation of the computing platform 1, the trigger point module 8 is independent from both breakpoint 5 and watchpoint module 6, even if they are interfaced in a similar manner to the debugger 2, i.e., externally or internally.

As shown in FIG. 3, the computing platform 1 comprises a data splitter 15 which receives the third trigger channel tProbe and the second breakpoint channel bPprobe.

As shown in FIG. 3, the computing platform 1 comprises a data splitter 15 that probes the actually executed instruction in the CPU 4 by means of the probeCPU channel. The memory address of the executed instruction retrieved by means of the probeCPU channel is then propagated to the breakpoint 6 and the trigger point modules by means of the bprobe and the tProbe channels, respectively.

It is important to note that the splitter 15 reduces to a signal connection between the tprobe and the probeCPU channels if the computing platform 1 does not implement the breakpoint module 6.

Advantageously, each trigger point module 8 has a first register 10a configured to store a first trigger point RefStartTrgPnt.

The first trigger point RefStartTrgPnt corresponds to a first instruction of the computer program when the CPU 4 executes the computer program.

Therefore, the first trigger point RefStartTrgPnt represents the start point of the synchronization process for the computing platform 1.

It is to be noted that, thanks to the first trigger point RefStartTrgPnt, the computing platform 1 is able to synchronize the computer program executed by the CPU 4 with an environmental parameter produced by at least one of the components of the computing platform 1.

The trigger point module 8 is, therefore, a passive element of the computer platform 1, since it does not interfere with the execution of the computer program running on the CPU 4.

By way of example, the computing platform 1 is able to synchronize the computer program executed by the CPU 4 with an environmental parameter produced by one, or a combination, i.e. a subset, or all the components of the computing platform 1.

In other words, thanks to the first trigger point RefStartTrgPnt, the environmental parameter, i.e. the signal such as the power trace, the temperature, with which the computing platform synchronizes itself can be generated by anyone of the components that constitute the computing platform 1.

Clearly, in order to obtain the synchronization between the signal and platform itself it is necessary that the CPU 4 executes the program, otherwise, in the case the CPU does not execute the program, no environmental parameters of interest are generated by the computing platform 1.

By way of example:
the environmental parameter produced by one or by a combination, i.e. a subset, of the components of the computing platform 1 can be a signal that represents a physical quantity, such as the power trace or the temperature.
the component or the combination of components, i.e. the subset, of the computing platform 1 can be only the memory 3 or only the CPU 4 or only the debugger 2 or only the trigger module 8 or a combination among a part or the whole of such components.

Figure 5A:
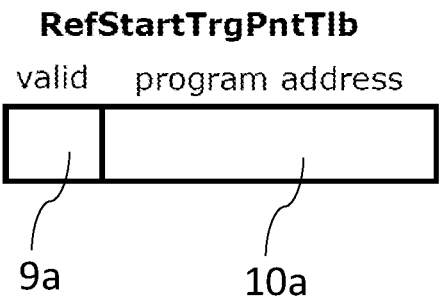
FIGS. 5A and 5B are a schematic views of data structures of the start and stop point used in the computing platform according to the present disclosure.

To this end with reference to FIG. 5A, the first trigger point RefStartTrgPnt has a data structure comprising the register 10a for storing a program address that corresponds to a first instruction of the computer program to be monitored.

Further, the data structure of first trigger point RefStartTrgPnt comprises a validity bit 9A that corresponds to signal if the corresponding trigger point is correctly configured.

The trigger point module 8 stores in a second register 10b a second trigger point RefStopTrgPnt that corresponds to a second instruction of the computer program to be monitored when the CPU 4 executes the program.

The second trigger point RefStopTrgPnt corresponds to a stop instruction of the computer program to be monitored.

Figure 5B:
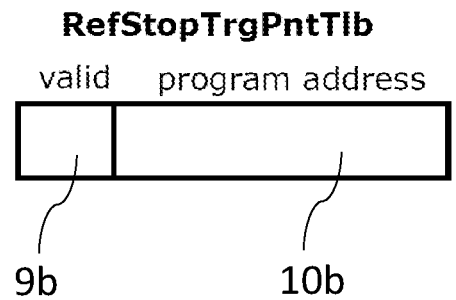

As shown in FIG. 5B, the second trigger point RefStopTrgPnt has a data structure comprising the register 10b for storing a program address that corresponds to a second program instruction of the computer program to be monitored.

Further, the data structure of the second trigger point RefStopTrgPnt comprises a validity bit 9b to signal if the value stored in the register 10a is valid.

The two reference trigger points, i.e., RefStartTrgPnt RefStopTrgPnt, represent, as described below, a synchronization window for the execution of the computer program by the computing platform 1.

The trigger point module 8 stores in third register 12 one or more observed trigger points ObsTrgPnt.

Figure 6:
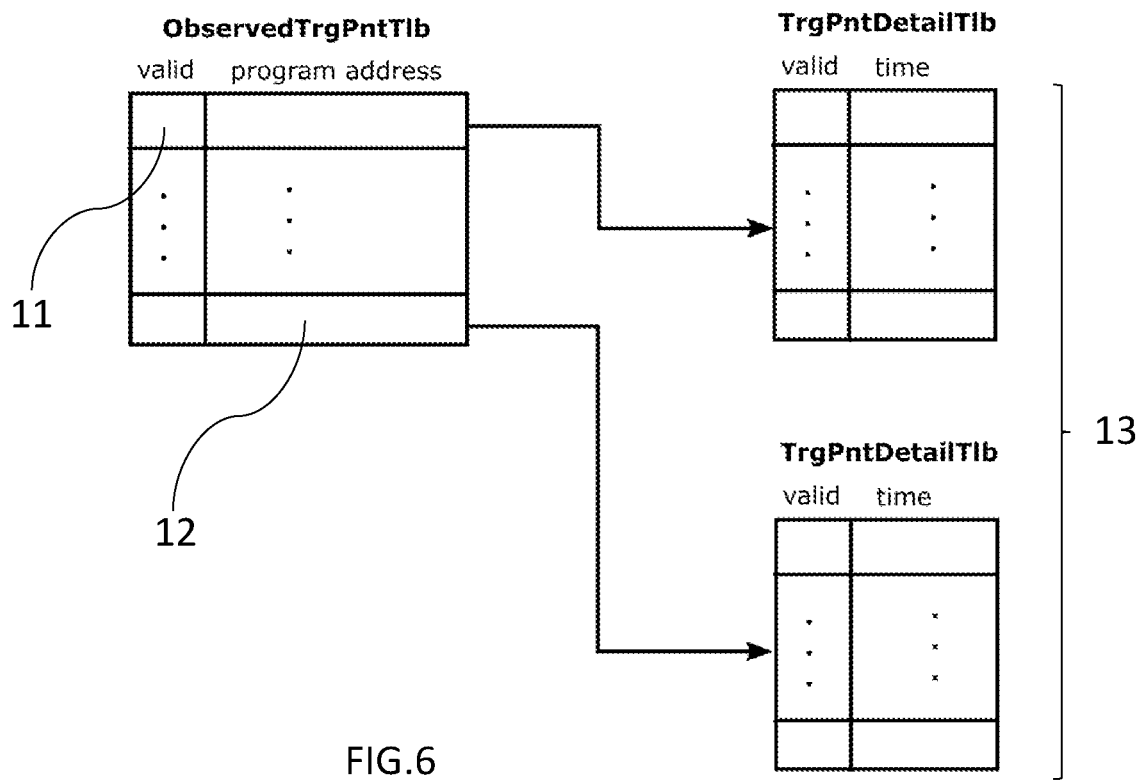
FIG. 6 is a schematic view of data structures of the observed point used in the computing platform according to the present disclosure

Each observed trigger point ObsTrgPnt, also with reference to FIG. 6, has a data structure that comprises a validity bit 11, to signal its correct configuration, the third register 12 for storing the program address that represents the instruction to be monitored and an auxiliary data structure 13, i.e., TrgPntDetailTlb.

In particular, as it will be more clear in the following, when an observed trigger point ObsTrgPnt is activated, i.e., the instruction stored at the monitored program address 12 is executed, the data structure 13, i.e. TrgPntDetailTlb, stores the time, in terms of number of clock cycles elapsed from the activation of the RefStartTrgPnt.

It is to be noted that the number of clock cycles relates to the clock signal of the computing platform 1.

Each of the observed trigger point ObsTrgPnt has to be placed within the time (or synchronization) window created by the reference trigger points, i.e., RefStartTrgPnt RefStopTrgPnt.

It is to point out that each observed trigger point ObsTrgPnt is used to monitor specific events or conditions that can occur during the execution of the computer program.

The number of implemented observable trigger points as well as the number of records in the data structure 13 (TrgPntDetailTlb) are implementation parameters.

The two reference trigger points, i.e., RefStartTrgPnt RefStopTrgPnt as well as the one or more observed trigger points ObsTrgPnt can be chosen arbitrarily by the programmer.

Figure 4:
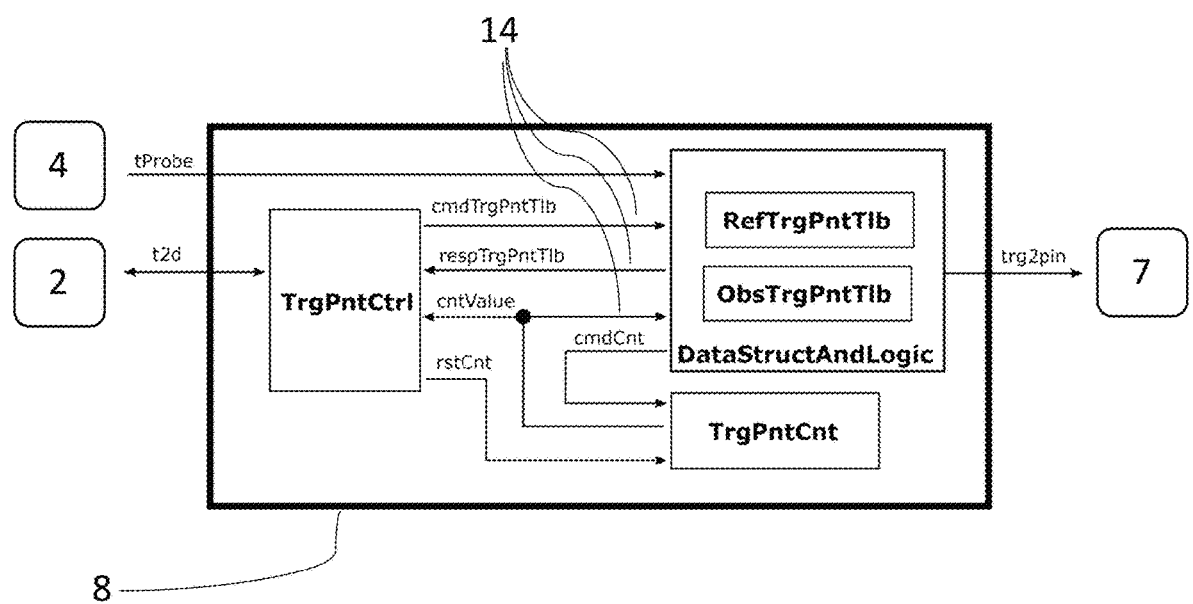
FIG. 4 is a schematic view of a specific element of the computing platform according to the present disclosure.

According to one aspect of the present description, and also with reference to FIG. 4, the trigger point module 8 in order to store and manage the two reference trigger points, i.e., RefStartTrgPnt RefStopTrgPnt and the observed trigger points ObsTrgPnt, comprises a controller TrgPntCtrl, a data register DataStructAndLogic and a clock cycle counter TrgPntCnt.

The controller TrgPntCtrl is in signal communication with:
the debugger 2 through the second trigger channel t2d,
the data register DataStructAndLogic through a plurality of channels 14 for setting (cmdTrgPntTlb), getting (respTrgPntTlb) or retrieving (cntValue) data from the data register DataStructAndLogic,
the clock cycle counter TrgPntCnt though a reset channel rstCnt.

The data register DataStructAndLogic is in signal communication with the CPU 4 through the channel tProbe, with the clock cycle counter TrgPntCnt through start channel cmdCnt, and with the pin 7 through the channel trg2pin.

It is to be noted that the data register DataStructAndLogic implements the trigger point data structures described in FIGS. 5A, 5B and 6 as well as the logic used to match the CPU events with the configured trigger point.

It is to point out also that the CPU 4 events directly come from the CPU pipeline through the tProbe signal. The tProbe signal encodes the address of the currently executed instruction and can be eventually shared with the breakpoint module 5, since it is a read only property of the CPU.

Again, with reference to FIG. 4, the TrgPntCtrl receives the requests from the debugger 2 via the t2d channel. Such requests are used to either set (force a new configuration) or get (retrieve the current configuration) the state of the trigger points, i.e., both reference and observed, as well as to retrieve the current configuration and the time details of the observed trigger points, i.e., the time when an observed trigger point has been matched. Hence, starting from the request from the debugger 2, the TrgPntCtrl configures and retrieves information from the DataStructAndLogic module.

It is to be pointed out that, depending on the type of trigger point matching with the CPU event two set of actions can take place:
- when the tProbe event matches with a configured reference trigger point, the DataStructAndLogic operates on the trg2pin to set or clear the physical pin 7 associated to the trigger point;
- when the tProbe event matches with a configured observed trigger point, the current value of the counter, that is read-out from the cntValue, is stored in the TrgPntDetailTlb corresponding to the matching observed trigger point.

In the case there are multiple matches, all the required actions are executed in parallel at hardware level.

It is be noted also that the TrgPntCtrl can only reset the counter module TrgPntCnt at configuration time. In contrast, the start and the stop commands to the clock cycle counter are driven by the DataStructAndLogic module subject to the matches between the tProbe event and the configured trigger points.

In particular, the counter is reset any time a new start command is issued.

To this end at each time the start reference trigger point is matched, a new, absolute starting point in time for any subsequent trigger point event is set.

The debugger module 2 is configured to generate a pulse whenever the first trigger point RefStartTrgPnt or the second trigger point RefStopTrgPnt has been asserted.

In other words, when the instruction corresponding to a program address that is associated to a trigger point is executed, a pulse event is generated.

The generated pulse is synchronous to the clock signal of the computing platform, i.e. the main clock that drives the CPU.

The at least one pin 7 is configured to propagate the pulse generated by the debugger module 2 to the electronic device Ext. Thus the generated pulse is externally propagated by forces pin 7 to drive either the logic "1" or the logic "0" value depending on if the program address is associated to a first trigger point RefStartTrgPnt or to a second trigger point RefStopTrgPnt, respectively.

The external propagation is totally desynchronized with respect to any clock, control or data signal of the computing platform.

In particular, it totally depends on the propagation delay due to the physical signals through pin 7.

It is worth noticing that the triggered value on pin 7 represents the sole information that makes possible the synchronization between the event in the computing platform and the external device.

$1^{st}$ Case: Computing Platform with a Single Trigger Point Module 8

Figure 7A:
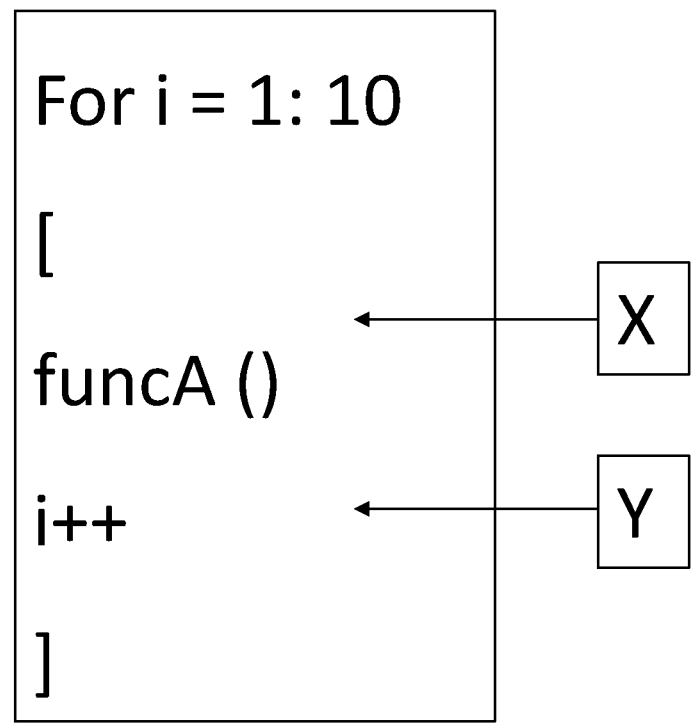
FIGS. 7A, 7B and 7C show respectively a vanilla code, a schematic configuration of the computing platform when the computing platform comprises a single trigger point module and a graph in function of the time of the results of the vanilla code of FIG. 7A, according to the present disclosure.
Figure 7B:
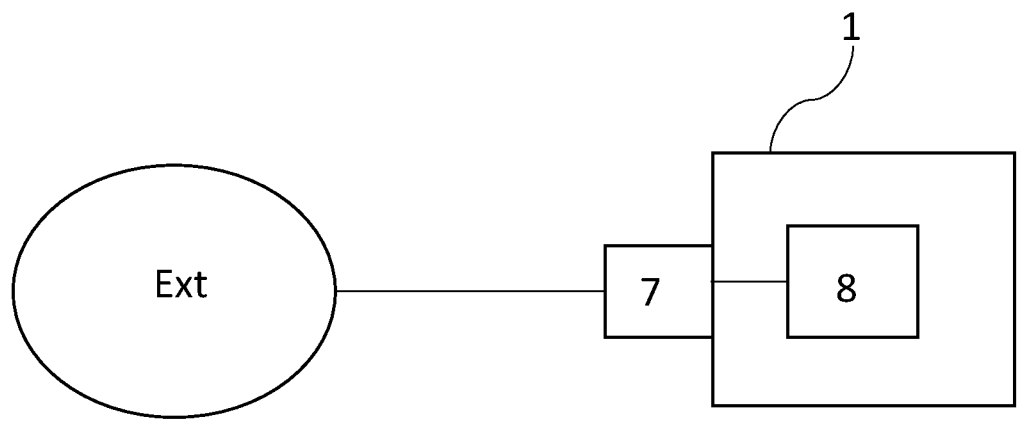
Figures 7C, 8A:
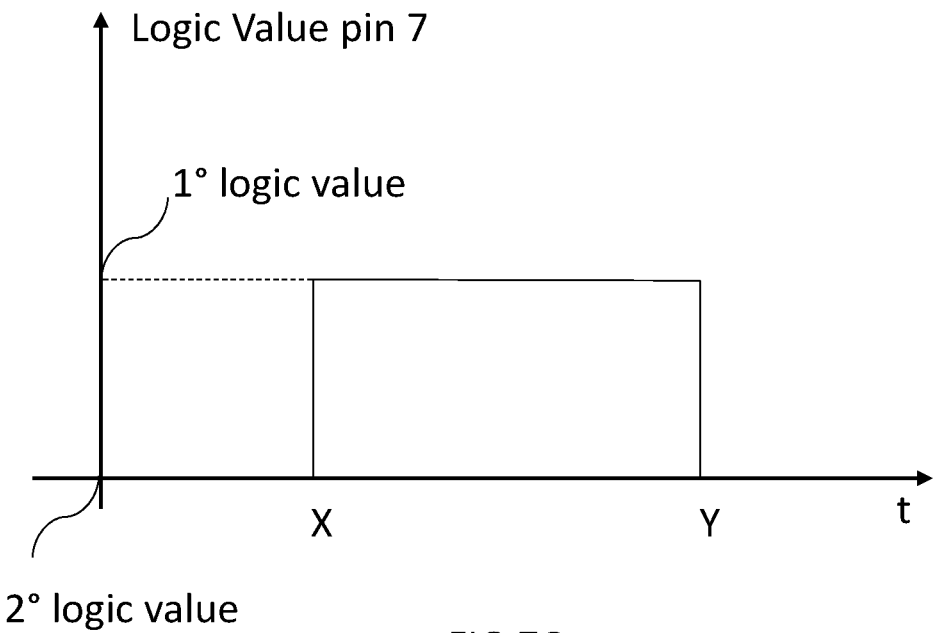
FIGS. 8A, 8B and 8C show respectively a vanilla code, a schematic configuration of the computing platform when the computing platform comprises two trigger point modules and a graph in function of the time of the results of the vanilla code of FIG. 8A, according to the present disclosure.

With reference to FIG. 7A-7C, in which FIG. 7A represents a vanilla code and the funcA( ) has to be monitored, indicated by the point X, FIG. 7B shown the signal communication among the external device Ext, the pin 7 and the platform 1 and FIG. 7C represent a graph in function of the time of the synchronization method.

It is to be noted that the environmental parameter is measured for the entire time duration of the execution of funcA( ).

For example, the FIGS. 7A-7C refer to the power trace generated by the execution of the funcA( ) by the CPU 4.

Alternatively, the signal can be the one generated by the memory 3 or by a combination of signals generated by the memory and the CPU 4 of the platform 1 that is executing the funcA( ).

It is to be noted also that the computing platform 1, in this $1^{st}$ case, comprises a single pin 7 and a single trigger point module 8.

In view of the above scenario, also with reference to FIG. 7C, when the instruction corresponding to the program address 10*a* stored is executed, the synchronization procedure starts with the action of reservation of the pin 7, i.e. there is a physical reservation of the pin 7. The pin 7 is set to the first logic value, i.e. set to logic "1".

It is clear that, contrary to the state of the art, the computing platform according to the disclosure delivers a non-invasive solution to synchronize the computer program executed on the CPU with an environmental parameter produced by the platform, since there is no need to change of the source code of the program executed by the CPU as well as there isn't any perturbation affecting signal measurements, since there isn't an additional software (or instructions) to be executed by the main CPU pipeline, and finally there isn't a low temporal synchronization accuracy, since the actual action of matching the memory address of the currently executed instruction of the computer program with the address stored in the RefStartTrgPnt object is performed at hardware level without the need of executing any software instruction.

Hence, by introducing the trigger point module 8 and the program address 10*a* stored in the RefStartTrgPnt point, it is possible to synchronize the execution of the program on the CPU 4 with any physical (analog or digital) signal produced by the host computer with fine temporal resolution, i.e., single clock cycle granularity.

In order to avoid problem with the data acquisition of the external device 7, again with reference to FIGS. 7A-7C, when the instruction corresponding to the program address 10*b* is executed, the synchronization procedure stops by deactivating the pin 7, i.e., clear pin 7. The pin 7 is set to the second logic value, i.e. set to logic "0" (clear), and the signal acquisition performed by the external device is stopped.

In this way all the advantages obtained by introducing the RefStartTrgPnt point are preserved also with the introduction of the RefStopTrgPnt point, since the actual action of matching the memory address of the currently executed instruction of the computer program with the address stored in the RefStopTrgPnt object is performed at hardware level without the need of executing any software instruction.

Moreover, the RefStartTrgPnt and the RefStopTrgPnt define the synchronization window for the execution of the computer program by the computing platform 1.

Within the synchronization window created by means of the reference trigger points, i.e. within the RefStartTrgPnt point and the RefStopTrgPnt point, the observed trigger points are used to monitor specific events or conditions of the computer program executed by the CPU 4.

When an observed trigger point ObsTrgPnt is activated, i.e., the instruction stored at the monitored program address 12 is executed, the data structure 13 (TrgPntDetailTlb) stores the time, in terms of number of clock cycles elapsed from the activation of the RefStarttrgPnt.

The counter of clock cycles allows to measure the elapsed time between the activation of the RefStartTrgPnt and the activation of any other trigger point ObsTrgPnt.

While the use of the observed trigger point ObsTrgPnt is not mandatory to offer the synchronization capabilities with the external device 7, their use can be configured to monitor specific instructions in the code so that is it possible to easily retrieve the state of all the signals in the host computer at the time the observed trigger point has been matched.

$2^{nd}$ Case: Computing Platform with Two Trigger Point Modules 8

Figure 8B:
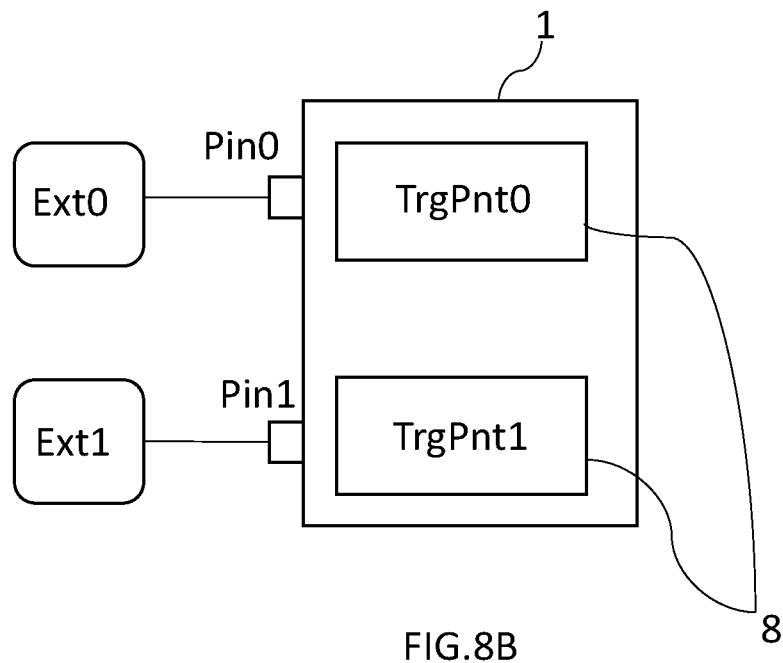
Figure 8C:
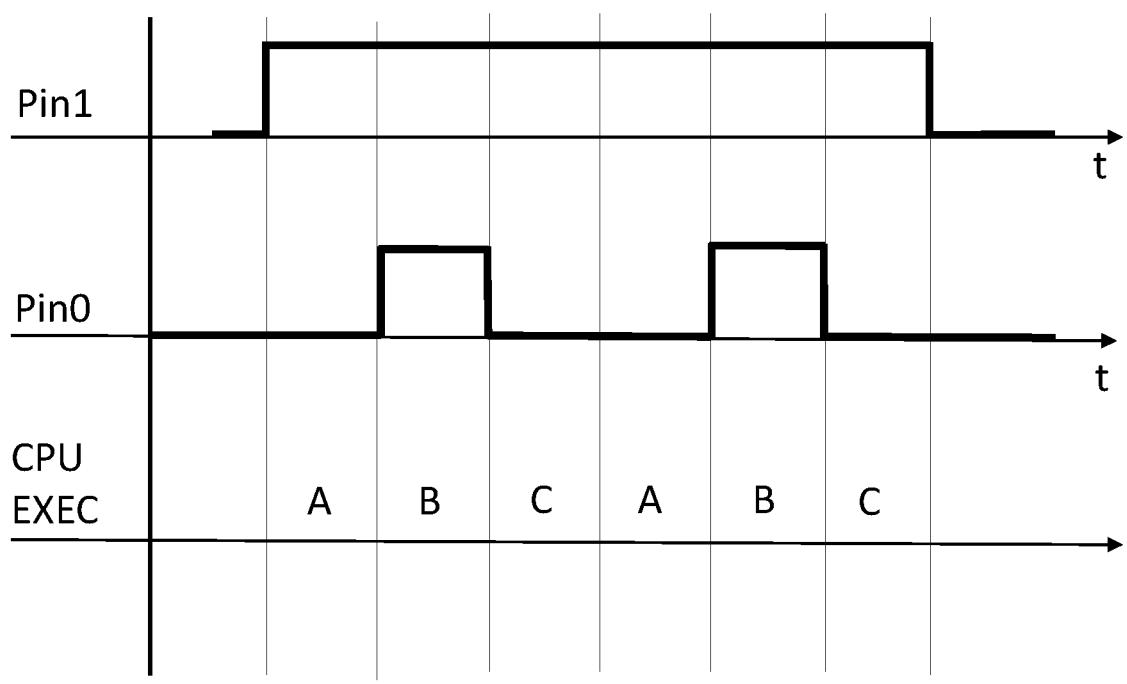

With reference to FIGS. 8A-8C, FIG. 8A represents a vanilla code of functions to be monitored, i.e. the three functions funcA( ), funcB( ) and funcC( ), FIG. 8B represents the use of two trigger point module 8, i.e. the trigger point TrgPnt0 and TrgPnt1, each one connected with a respective pin 7, i.e. the pins indicated with pin0 and pin1, and each pin 7 is connected to a respective external device Ext0 and Ext1. FIG. 8C represents a graph over time of the synchronization procedure when two environmental parameters, e.g. power and temperature, must be synchronized with the external device EXT during the execution of a single application.

For example, the trigger module TrgPnt1 along with the pin pin1 and the external device Ext1 are dedicated to whole code (i.e. the three functions funcA( ), funcB( ) and funcC( )) of which the first environmental parameter has to be synchronized for its analysis, i.e. the power, whereas the trigger module TrgPnt0 along with the pin pin0 and the external device Ext0 are dedicated to the funcB( ) only of which the second environmental parameter has to be synchronized for its analysis, i.e. the temperature.

To this end, in order to synchronize the first environmental parameter, the trigger module TrgPnt1 stores its own points RefStartTrgPnt and RefStopTrgPnt with their respective address program and, in order to synchronize the second environmental parameter, the trigger module TrgPnt0 stores its own points RefStartTrgPnt and RefStopTrgPnt with their respective address program.

As it is clear from the FIG. 8C, the two environmental parameters, e.g. power and temperature, are synchronized with their respective external devices Ext0 and Ext1 independently one from the other without affecting the functioning of the CPU 4.

Figure 9:
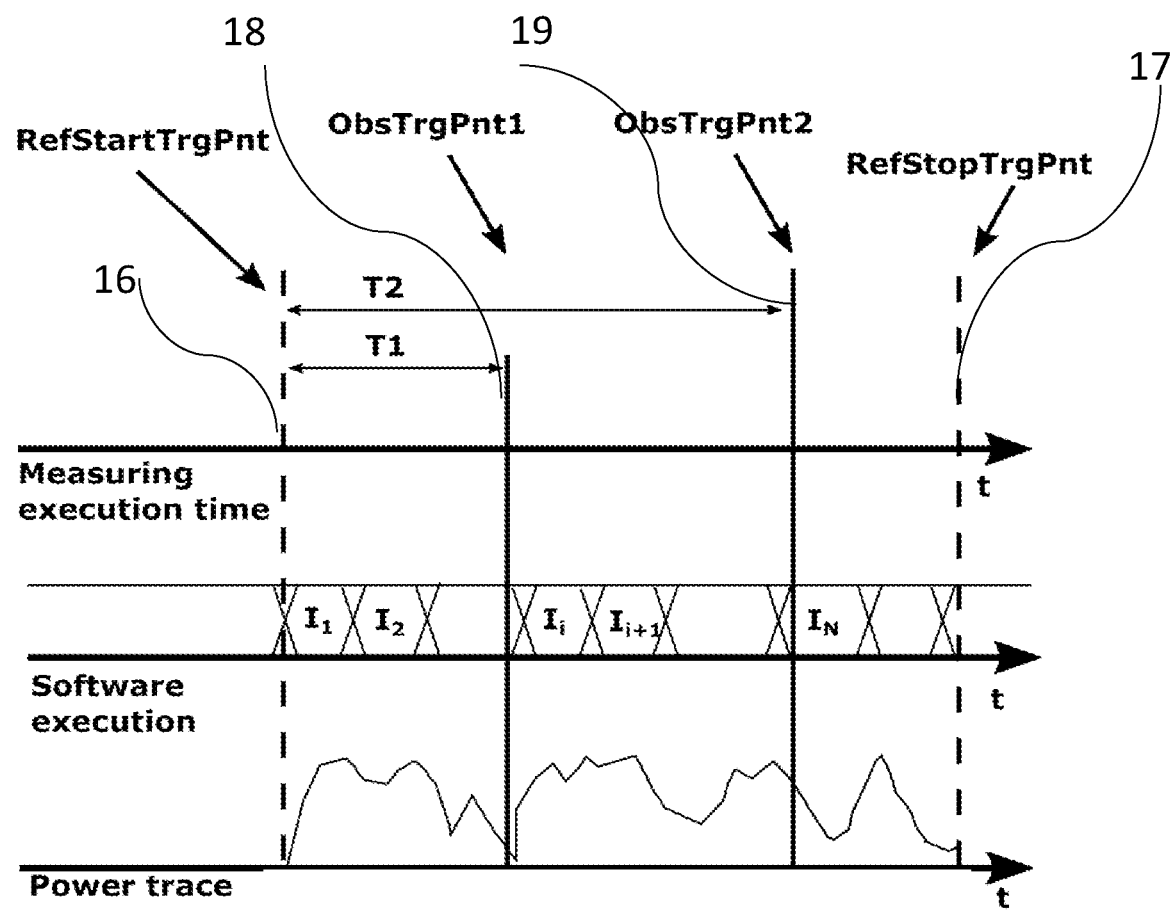
FIG. 9 shows the evolution over time of a use case scenario according the computing platform depicted in FIG. 8B.

With reference now to FIG. 9, the use of the trigger points RefStartTrgPnt and RefStopTrgPnt allows to synchronize the execution of the computer program running on the CPU 4 of the computing platform 1 of FIG. 8C with any physical (analog or digital) signal produced by the platform with a temporal resolution equal to the time period of the clock signal of the computing platform.

For example, FIG. 9 shows the possibility of synchronizing acquisition over time (indicted in FIG. 9 with an abscissa axis labeled "Measuring execution time") of the power trace (pointed out in FIG. 9 with an abscissa axis labeled "Power Trace") when an instruction $I_1$ (among the other instructions $I_2, \ldots, I_N$) of the computer program starts its execution (indicted in FIG. 9 with an abscissa axis labeled "Software execution").

In particular, the execution of instruction I1 triggers the RefStartTrgPnt point (pointed out in FIG. 9 with a vertical axis 16) and the reserved pin 7 is set to the first logic value (i.e. "1") by the trigger point module 8. In this scenario, such pin 7 is used to trigger the data acquisition of the oscilloscope side, i.e. of the external device Ext.

The execution of another instruction triggers the RefStopTrgPnt point (indicted in FIG. 9 with a vertical axis 17) and the reserved pin 7 is set to second logic value (i.e. "0") by the trigger point module 8. In this scenario, such pin 7 is used to deactivate the data acquisition of the oscilloscope side.

In FIG. 9, two observed trigger points, i.e., ObsTrgPnt1 and ObsTrgPnt2, are reported (see vertical axes 18, 19, respectively). The two observed trigger points are used for monitoring two specific instructions of the computer program. The first and the second observed trigger points, i.e., ObsTrgPnt1 and ObsTrgPnt2, are temporally spaced from the RefStartTrgPnt trigger point (pointed out in FIG. 9 with a vertical axis 16) of a period T1 and T2, respectively. It is to be noted that the periods T1 and T2 represent the time, in terms of number of clock cycles, elapsed from the activation of the RefStartTrgPnt.

Computer Implemented Method

Advantageously the use of the trigger points RefStartTrgPnt, RefStopTrgPnt and observed points ObsTrgPnt allows to obtain a computer implemented method for synchronizing the execution of a computer program executed on a physical computing platform and the same program executed on the virtualized version of the same computing platform that is simulated by means of an RTL simulator.

In fact, without the actual computer implemented method it is to be noted that the computer program execution on the platform having the CPU 4 represents a black box from the hardware debug viewpoint. Both prior art watchpoint and breakpoint methodologies allow to perform a software debug of the executed computer program directly on the platform having the CPU 4, by conditionally suspend the computer program execution to inspect the platform state, i.e., memory and register values of the CPU 4.

Considering the virtualized computing platform executed by means of an RTL simulator, the hardware breakpoint is a mechanism to support hardware debug solution. A hardware breakpoint is associated to a line of the RTL description of the computing platform and its semantic allows to halt the RTL simulator when such line in the RTL description is reached. Considering the possibility of halting the RTL simulation offered by the hardware breakpoints, such mechanism shares a similar semantic with the software breakpoints. In particular, each hardware breakpoint is associated to a line of the RTL description and it allows to halt the RTL simulation when the execution of such line is reached. The software breakpoint is associated to an instruction of the computer program and it allows to halt the computer program execution when such instruction is executed.

In other words, the hardware breakpoints can halt the execution of the virtualized computing platform to inspect the value of its signals.

However, the hardware breakpoints do not allow to synchronize the action of halting the RTL simulation with the execution of an instruction in the computer program. Considering programmable CPUs, the possibility of synchronizing the internal state of the computing platform, i.e., the value of the internal wires, with the execution of the computer program is of utmost importance to effectively support hardware debug techniques.

It is to be noted also that, the RTL simulation of the computing platform having the CPU 4 executing a computer program is the primary means of hardware debugging. In particular, the activation of the Value Change Dump (VCD) option into the RTL simulator allows to track the evolution over time of each signal of the computing platform. However, the full observability of the hardware has a huge cost in terms of simulation speed. In particular, the use of the VCD option within the RTL simulation slows down the simulation by several orders of magnitude with respect to the RTL simulation. Moreover, the execution of the computer program by means of the virtualized computing platform, i.e., simulated through the RTL simulator, is order of magnitude slower that the execution of the same computer program by the physical version of the same computing platform. To optimally trade the hardware observability with the simulation speed, a method to synchronize the execution of selected program instructions with the activation of the VCD option within the RTL simulator is of utmost importance.

In this scenario, the computer implemented method for synchronizing the platform having a CPU 4 that executes the computer program with the simulator RTL, comprises the step of:
providing a host computer HC;
providing a virtualized computing platform 1 having the CPU 4;
providing a computer program to be executed by the CPU 4 of the virtualized computing platform 1;
providing an RTL simulator that runs on the computer HC for simulating the computing platform 1 when the CPU 4 executes the computer program.

In particular, the virtualized computing platform 1 is obtained by compiling the RTL description of the computing platform to be executed/simulated by means of an RTL simulator.

In particular, the virtualized computing platform 1 comprises a virtualized debugger 2, a virtualized memory 3, a virtualized CPU 4 as well as virtualized clock generator (for generating a virtualized clock signal) and a virtualized at least one pin 7 and trigger point module 8, i.e. the virtualized version of all the components that constitute the physical version of the computing platform.

In view of the above, one or better two trigger points allow to define a time window, i.e., between the start and stop reference trigger point refStartTrgPnt and refStopTrgPnt, to synchronize the activation and or the deactivation of the specific RTL simulator's functions.

In other words, the single or multiple trigger points allow to synchronize the activation and/or the deactivation of the Value Change Dump (VCD) functionality into the RTL simulator in order to selectively dump the evolution over time of the signals of the virtualized computing platform 1.

Figure 10:
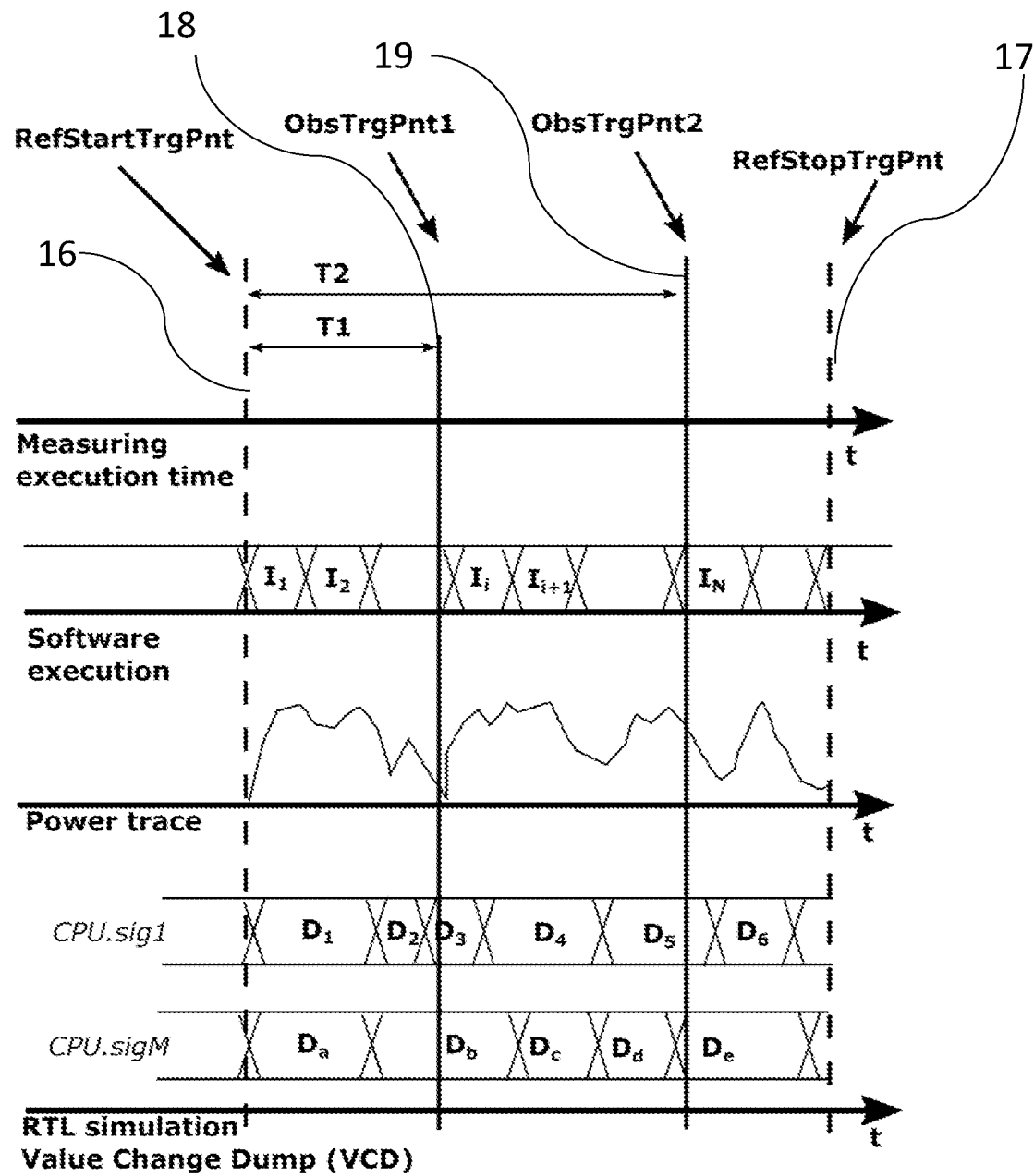
FIG. 10 shows the temporal synchronization between a measured power trace obtained from the computer program executed on the physical computing platform and the RTL evolution over time of some CPU signals obtained from the RTL simulation of the same virtualized computing platform, according to the present disclosure.

FIG. 10 highlights the possibility of synchronizing the computer program executed by the CPU 4 with an environment parameter produced by the physical computing platform and the evolution over time of the signals in the virtualized version of the same computing platform executing the same computer program (pointed out in FIG. 10 with an abscissa axis labeled "RTL simulation Value Change Dump (VCD)").

Particularly, the computer implemented method for synchronizing the platform having a CPU 4 comprises a phase of generating a virtual pulse synchronized with the virtualized clock signal whenever one trigger point RefStartTrgPnt has been asserted so as to synchronize the execution of said computer program running on the virtualized CPU 4 with any signal produced by the virtualized platform 1 with a temporal resolution equal to the virtualized clock signal.

Further the computer implemented method for synchronizing the platform having a CPU 4 comprises the step of propagating the virtual pulse externally by said least one virtualized pin 7 in a desynchronized way with respect to the virtualized clock signal.

It is to be noted that, when the instruction I1 is executed the match with the start reference trigger point force the reserved pin 7 to the first value logic, i.e. "1". It is to be noted that the RTL simulator has been configured to active the VCD option depending on the value of the pin 7.

Such RTL simulation configuration is available in all the commercial (Cadence ncsim, Mentor QuestaSim, Xilixn xsim) and opensource simulators (ncverilog). To this end, FIG. 10 shows the possibility, for a hardware architect, to observe the evolution over time of the signals in the CPU 4, i.e., CPU.sig1 and CPU.sigM.

For example, again with reference to FIG. 10, the observed point ObsTrgPnt2 allows to sharply synchronize the execution of its associated computer program instruction with the actual values of CPU.sig1 and CPU.sigM signals, i.e., $D_5$ and $D_e$ (among the other signals $D_1, \ldots D_6$ for the CPU signal CPU.sig1 and among the signals $D_a, \ldots D_e$, for the CPU signal CPU.sigM).

It is worth noting that the trigger points allow to monitor the advance of the program execution. The start trigger point is configured with the address of the first executed instruction in the main function, while the available observed trigger points are configured to monitor specific computer program instructions/functions in the computer program. Moreover, the action associated to a trigger point is activated when its associated computer program instruction is executed.

It is to be noted that a timestamp associated to the trigger point is stored at the time of match. Such time can be used during the postprocessing phase to center the VCD log at the time the match happened.

According to one aspect, the coordinated use of reference RefStartTrgPnt point and and observed trigger points ObsTrgPnt allows to measure the time distance between two events. From a one hand, the match with the start reference trigger point RefStartTrgPnt forces the counter to start its counting from zero, thus setting an absolute point in time to measure the match of any subsequent observed trigger point ObsTrgPnt.

When an observed trigger point ObsTrgPnt is matched, the current value of the counter is stored into the corresponding data structure 13 (TrgPntDetailTlb). To this end, it is possible to measure i) the time distance between two matches of the same trigger point and ii) the time distance between the matches on two different trigger points.

At the end of the program execution or in case of a software bug that prevents the correct code execution, the data retrieved from the data structure 13 (TrgPntDetailTlb) allow to rebuild the execution order of the monitored instructions/functions.

Those skilled in the art will obviously appreciate that several changes and variants may be made to the arrangements as described hereinbefore to meet incidental and specific needs. All these variants and changes fall within scope of the disclosure, as defined in the following claims.

The invention claimed is:
1. A computing platform for synchronize a program executed by a CPU of the computing platform with an environmental parameter produced by at least one component of the computing platform, said computing platform comprising:
- a memory configured for storing instructions and data of a computer program;
- a CPU configured for executing said computer program;
- a clock generator for generating a clock signal;
- a debugger module being in signal communication with said memory through a first debugger channel;
- at least one pin and at least one trigger point module,
- said at least one pin being connectable to an electronic device that is external to the computing platform;
- said at least one trigger point module being in signal communication with:
  - said at least one pin through a first trigger channel,
  - said debugger module through a second trigger channel,
  - said CPU through a third trigger channel;
- said at least one trigger point module having a first register for storing a first trigger point that corresponds to a first instruction of said computer program to be monitored when executed by the CPU;

characterized in that:
- said debugger module is configured to generate a pulse synchronized with the clock signal whenever said first trigger point has been asserted so as to synchronize an execution of said computer program running on the CPU with any physical signal produced by the platform with a temporal resolution equal to the clock signal;
- said at least one pin is configured to propagate said pulse generated by the debugger module to the electronic device in a desynchronized way with respect to the clock signal.

2. The computing platform according to claim 1, wherein said at least one trigger point module has a second register for storing a second trigger point, that corresponds to a second instruction of said computer program to be monitored when executed by the CPU.

3. The computing platform according to claim 1, wherein said trigger point module comprises a controller, a data structure and a clock cycle counter, said controller being in signal communication with:
- the debugger through the second trigger channel,
- the data structure through a plurality of channels for setting, getting or retrieving data from the first register,
- the clock cycle counter through a reset channel,
- said data structure being in signal communication with the CPU through third channel and with the clock cycle counter through start channel.

4. The computing platform according to claim 3, wherein said data structure comprises said first register and a second register that stores said first instruction or a second instruction of said computer program to be monitored, respectively.

5. The computing platform according to claim 1, wherein said at least one trigger point module has a third register for storing an observed trigger point, that corresponds to a third instruction of said program to be monitored when executed by the CPU.

6. The computing platform according to claim 5, wherein said observed trigger point has a data structure comprising an auxiliary data structure and the third register.

7. The computing platform according to claim 6, wherein auxiliary data structure is configured to store a time, in terms of number of clock cycles elapsed from an activation of said first trigger point.

8. The computing platform according to claim 1, comprising an instruction bus and a data bus configured to fetch the program instructions and to load/store program data in said CPU from said memory.

9. The computing platform according to claim 1, characterized by comprising a breakpoint module that is in signal communication with the debugger module through a breakpoint channel and with said CPU through a second probe channel.

10. The computing platform according to claim 1, characterized by comprising a watchpoint module being in signal communication with the debugger module through a watchpoint channel and with said CPU through a third probe channel.

* * * * *